J. M. CASE.
Velocipede.

No. 88,366.                          Patented March 30, 1869.

Witnesses
Chas. F. Brown
C. C. Brown.

Inventor
J. M. Case.
by
Geo. E. Brown, Atty.

J. M. CASE, OF WORTHINGTON, OHIO.

Letters Patent No. 88,366, dated March 30, 1869.

IMPROVEMENT IN VELOCIPEDES.

The Schedule referred to in these Letters Patent and making part of the same.

*To all whom it may concern:*

Be it known that I, J. M. CASE, of Worthington, in the State of Ohio, have invented a new and useful Improvement in Velocipedes; and I do hereby declare that the following is a full, clear, and exact description of the same, reference being had to the accompanying drawings, and letters of reference marked thereon, making a part of this specification, in which—

Figure 3 is a plan view of the rocking-seat, showing its connection with the driving-lever.

Figure 1:
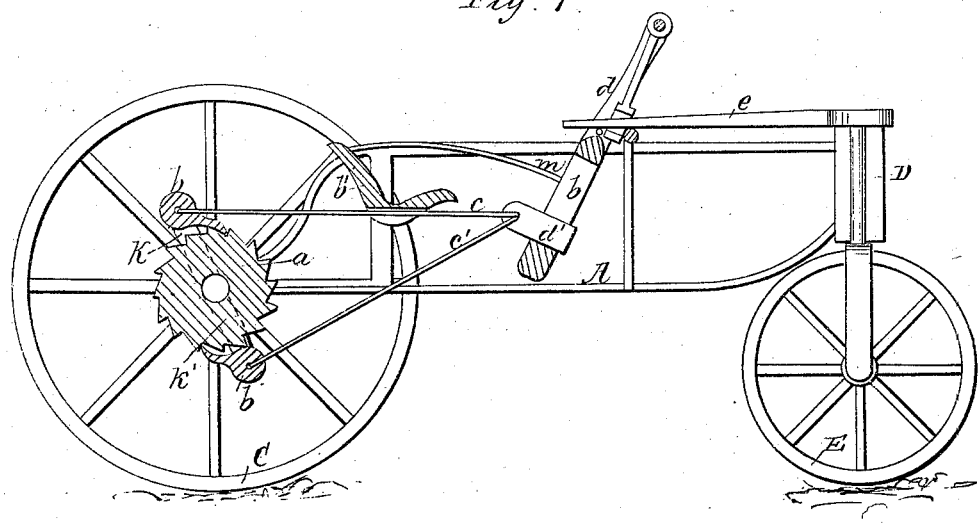
Figure 1 is a longitudinal vertical section, showing the arrangement of the complementary pawls in connection with the ratchet and driving-lever.
Figure 2:
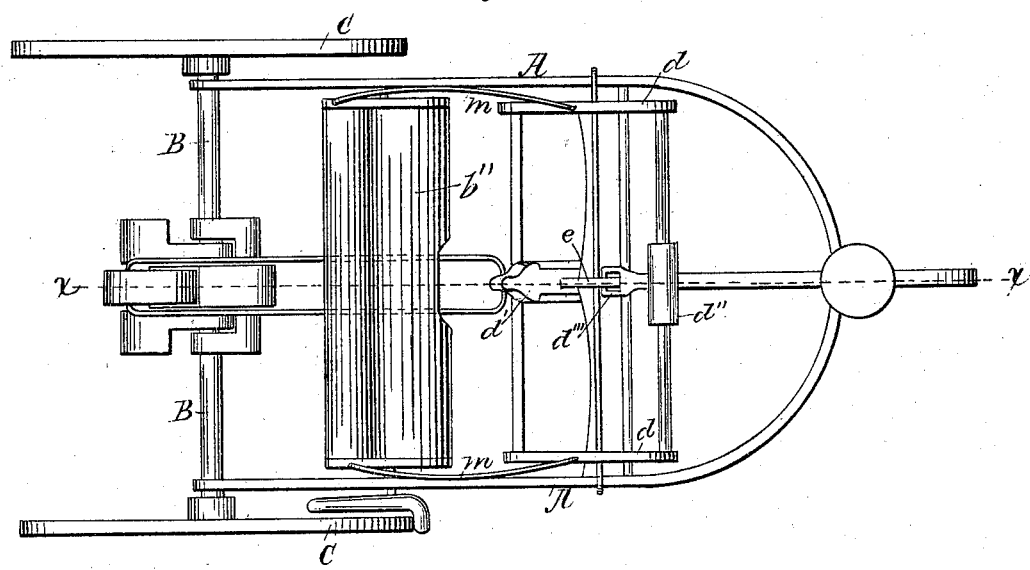
Figure 2 is a transverse vertical section, showing the arrangement of the slide $d'$ in connection with the driving-lever; and also, in the same connection, the arrangement of the sliding handle $d''$ and guide-lever $e$.

To enable those skilled in the art to make and use my invention, I now proceed to describe its construction and operation.

Similar letters in the drawings refer to like parts.

This invention consists in connecting to the driving-lever of a velocipede, a device for operating the same, for the benefit of the weaker sort of riders.

Also, in adapting to the driving-lever of a velocipede, a device for the more convenient steering of the apparatus.

In the drawings, the velocipede is represented as consisting of a frame, A, mounted at its rear end upon the axle B of the driving-wheels C C, and converging at its forward end upon a post, D, which bestrides the forward, or steering-wheel E.

To the frame A, near its rear end, is pivoted a seat, $b''$, and, at a suitable distance in front of the seat, a lever, $d$, which is operated by both the hands and feet of the sitter.

Rods $c\ c'$ connect the lower part of the lever $d$ with two pawls, $b\ b'$, placed diametrically opposite each other, said pawls being pivoted respectively to frames $k\ k'$, which frames are placed loosely, one within the other, upon the axle B, and extend from the axle in opposite directions.

A ratchet-wheel, $a$, is rigidly attached to the axles inside of both frames.

With the teeth of the wheel $a$, upon opposite sides thereof, the pawls $b\ b'$ engage.

The operation of the pawls is thus:

The rods $c\ c'$ being both connected with the lever $d$ at the same point, when the lower end of the lever is thrown forward, the pawl $b$ is drawn forward, revolving the ratchet-wheel $a$, and consequently the axle B and the driving-wheels, while, at the same time, the pawl $b'$ is drawn back over the teeth of the ratchet-wheel, and toward the pawl $b$.

When the lower end of the lever $d$ is thrown backward, the pawl $b'$ engages with the ratchet-teeth, still revolving the driving-wheels forward, and the pawl $b$ is thrust back over the ratchet-teeth, and away from the pawl $b'$. Thus the action of the two pawls is complementary, and whether the throw of the lever $d$ be backward or forward, the action of each pawl is always forward.

That part of the lever $d$ to which the connecting-rods $c\ c'$ are attached, is a knob, $d'$, arranged to slide in a vertical slot, $l'$, of the cross-piece $l$ of the lever-frame $d$.

By moving the knob $d'$ up or down, the resistance the lever has to encounter in moving the carriage, is diminished or increased, and may be suited to the strength of the occupant.

The vehicle is steered by means of the forward wheel, which may be turned to the right or left by moving the tiller $e$. The latter movement is effected through the agency of the handle $d''$, which slides upon the upper cross-beam of the lever-frame $d$, and has a slot, $d'''$, near its lower end, through which passes the tiller $e$.

The handle $d''$ is within easy reach of the occupant of the seat.

The seat $b''$ is pivoted to the frame A, so as to vibrate, and being connected with the lever $d$, by means of rods $m\ m$, the rocking motion imparted to the seat by the body of the occupant aids in producing the movements of the lever to such an extent that the sitter may simply rock to and fro, and, while enjoying this pleasant motion, may propel the carriage with scarce any muscular exertion.

I contemplate varying the construction here set forth, on occasion, by dispensing with the frame, and substituting therefor a body, made in the form of a boat, water-tight, which shall be hung under the axle, and be provided with the propelling and steering-machinery above described, and with driving-wheels, having flattened spokes, suitable for propelling the apparatus through water.

This form of velocipede may be used with equal convenience on land or in water, enabling the traveller, on coming to a river, to plunge boldly in, and safely reach the other shore.

I also propose to mount the frame, with its mechanism, upon runners, suitable for travelling upon snow, instead of wheels, using a short runner instead of the fore wheel, and placing upon the rear axle a toothed wheel, suitable for acting upon ice, and the like, to effect the propulsion of the carriage.

I am aware of the English patent of A. Goodrich, No. 1,213, 1864; and I hereby disclaim operating a velocipede by means of the rocking motion of the seat.

Having thus described my invention,

What I claim as new, and desire to secure by Letters Patent, is—

1. The sliding knob $d'$, so arranged, in connection with the lever $d$, that the leverage of the latter may be increased or decreased at pleasure.

2. The slotted sliding handle $d''$, so combined with the driving-lever $d$ and the guide-lever $e$, as to govern the direction of the steering-wheel, substantially as described.

Witnesses:            J. M. CASE.
  HENRY T. BROWN,
  A. G. BROWN.